US009344972B2

United States Patent
Li et al.

(10) Patent No.: US 9,344,972 B2
(45) Date of Patent: May 17, 2016

(54) UPLINK POWER CONTROLLING METHOD AND UPLINK SIGNAL RECEIVING METHOD THEREOF

(71) Applicant: Pantech Co., Ltd., Seoul (KR)

(72) Inventors: Jian Jun Li, Seoul (KR); Jong Nam Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 167 days.

(21) Appl. No.: 14/238,024

(22) PCT Filed: Sep. 28, 2012

(86) PCT No.: PCT/KR2012/007901
§ 371 (c)(1),
(2) Date: Feb. 10, 2014

(87) PCT Pub. No.: WO2013/048176
PCT Pub. Date: Apr. 4, 2013

(65) Prior Publication Data
US 2014/0192673 A1 Jul. 10, 2014

(30) Foreign Application Priority Data

Sep. 30, 2011 (KR) .................. 10-2011-0100083

(51) Int. Cl.
*H04W 52/24* (2009.01)
*H04B 7/02* (2006.01)
(Continued)

(52) U.S. Cl.
CPC ............. *H04W 52/242* (2013.01); *H04B 7/024* (2013.01); *H04L 5/0032* (2013.01); *H04W 52/46* (2013.01)

(58) Field of Classification Search
CPC ..... H04W 52/00; H04W 52/04; H04W 52/18; H04W 52/24; H04W 52/242; H04W 52/46; H04B 7/024; H04L 5/0032
See application file for complete search history.

(56) References Cited

U.S. PATENT DOCUMENTS 8,706,152 B2 * 4/2014 Seo .................. H04W 52/10
370/315
9,179,419 B2 * 11/2015 Park .................. H04W 52/242
(Continued)

FOREIGN PATENT DOCUMENTS

KR 10-2009-0039919 4/2009
KR 10-2009-0097805 9/2009
(Continued)

OTHER PUBLICATIONS

International Search Report issued on Mar. 8, 2013 in the International Application No. PCT/KR2012/007901.

*Primary Examiner* — Chi H Pham
*Assistant Examiner* — Weibin Huang
(74) *Attorney, Agent, or Firm* — H.C. Park & Associates, PLC

(57) ABSTRACT

The present invention relates to an uplink power control method and apparatus and an uplink signal receiving method and apparatus using the same. According to an embodiment of the present invention, there is provided a method of receiving an uplink signal, the method of including selecting receiving points in a CoMP (Coordinated Multi-Point) system, transmitting CoMP setting information to UE, and receiving uplink transmission from the UE, wherein uplink transmission power used for the uplink transmission is controlled based on an effective path loss calculated by using at least one of path losses between the UE performing the uplink transmission and points in the CoMP system. According to the present invention, when uplink transmission power control is performed in the uplink CoMP system, path losses for a plurality of receiving points are reflected so that power control may be exactly done.

17 Claims, 13 Drawing Sheets

(51) Int. Cl.
*H04W 52/46* (2009.01)
*H04L 5/00* (2006.01)

(56) References Cited

U.S. PATENT DOCUMENTS

2011/0103241 A1    5/2011  Cho et al.
2012/0238305 A1*   9/2012  Xiao .................... H04W 52/40
                                               455/509
2013/0040578 A1*   2/2013  Khoshnevis ........ H04W 52/242
                                               455/67.11
2013/0343218 A1*  12/2013  Pajukoski .............. H04B 7/024
                                               370/252

FOREIGN PATENT DOCUMENTS

KR    10-2010-0006144    1/2010
KR    10-2011-0088765    8/2011
WO       2009-051362     4/2009

* cited by examiner

UPLINK POWER CONTROLLING METHOD AND UPLINK SIGNAL RECEIVING METHOD THEREOF

CROSS-REFERENCE TO RELATED APPLICATIONS

This application is the National Stage Entry of International Application PCT/KR2012/007901, filed on Sep. 28, 2012, and claims priority from and the benefit of Korean Patent Application No. 10-2011-0100083, filed on Sep. 30, 2011, all of which are incorporated herein by reference in their entireties for all purposes as if fully set forth herein.

BACKGROUND

1. Field

The present invention relates to a wireless communication system, and more specifically to a technology of controlling power for uplink transmission in a CoMP (Coordinated Multi-Point).

2. Discussion of the Background

Recently, MIMO (Multi-Input Multi-Output) systems are used to transmit high-speed, high-capacity data so as to raise transmission efficiency. Together with this, MIMO-based CoMP technologies are under discussion.

CoMP is directed to technologies of adjusting or combining signals transmitted from multiple points, and CoMP may have applications to increase data rate as well as to obtain high quality and high throughput.

As CoMP-supportive terminals, user equipment to which CoMP applies in a CoMP environment (hereinafter, a CoMP-supportive or CoMP-applicable system is referred to as 'CoMP environment' for convenience of description)? such user equipment is hereinafter referred to as 'user equipment operating in a CoMP mode) aim to simultaneously receive data from a CoMP cooperated set or with the interference minimized in the CoMP cooperated set in consideration of the channel environment in each of cells constituting the CoMP cooperated set, so it need measure the channel information regarding each cell and report it to a serving cell of a corresponding user equipment.

The CoMP cooperated set refers to a set of points that directly or indirectly participate in (geographically away from) data transmission in any time-frequency resource for one UE (User Equipment). Here, "directly participate in data transmission" means that the points actually transmit data to UE in the corresponding time-frequency resource, and "indirectly participate in data transmission" means that the points do not actually transmit data in the corresponding time-frequency resource but contribute to making determinations on user scheduling/beamforming.

Meanwhile, it is required to define reference information, e.g., reference signal, to generate channel information in the CoMP cooperated set consisting of various cells and to share the information between the user equipment and base station.

SUMMARY

An object of the present invention is to provide a method and apparatus for exactly controlling uplink transmission power when JR (Joint Reception) applies to an uplink CoMP system.

An object of the present invention is to provide a method and apparatus of controlling uplink transmission power by reflecting path losses for a plurality of receiving points in an uplink CoMP system.

An object of the present invention is to provide a method and apparatus of calculating an effective path loss that reflects path losses for a plurality of receiving points so as to effectively control uplink transmission power in an uplink CoMP system.

An object of the present invention is to provide a method and apparatus of selecting path losses for a plurality of receiving points that are to be reflected to calculate effective path losses.

An object of the present invention is to provide a method and apparatus of selecting path losses for a plurality of receiving points corresponding to the type of control information that is transmitted from the base station to the user equipment.

(1) According to an embodiment of the present invention, there is provided a method of receiving an uplink signal, the method of including selecting receiving points in a CoMP (Coordinated Multi-Point) system, transmitting CoMP setting information to UE, and receiving uplink transmission from the UE, wherein uplink transmission power used for the uplink transmission is controlled based on an effective path loss calculated by using at least one of path losses between the UE performing the uplink transmission and points in the CoMP system.

(2) In (1), the CoMP setting information includes information indicating the selected receiving points, and the effective path loss may be calculated based on path losses for the selected receiving points.

(3) In (1), the CoMP setting information includes information regarding the number M of the receiving points, and the effective path loss may be calculated based on M path losses having the smallest value among path losses for points in the CoMP system.

(4) In (1), the CoMP setting information includes information regarding a path loss offset, and the effective path loss may be calculated based on a path loss having the smallest value among path losses for points in the CoMP system and path losses whose differences from the path loss having the smallest value are smaller than the path loss offset.

(5) In (1), the CoMP setting information may be included in downlink control information transmitted over PDCCH.

(6) In (1), the CoMP setting information may be included in a RRC (Radio Resource Control) message and transmitted.

(7) According to another embodiment of the present invention, there is provided a method of controlling uplink power, the method including calculating path losses for transmission points in a CoMP (Coordinated Multi-Point) system, calculating an effective path loss based on at least one of the path losses, and performing uplink power control based on the effective path loss, wherein the effective path loss is calculated based on a predetermined number of reference path losses selected among the path losses.

(8) In (7), the reference path losses may be path losses for receiving points indicated by a base station among the path losses.

(9) In (7), the reference path losses may be path losses selected by a number indicated by a base station among the path losses.

(10) In (9), the reference path losses may be path losses selected by a number indicated by the base station from among path losses having the smallest value of the path losses.

(11) In (7), the reference path losses may include a predetermined standard reference path loss selected among the path losses and path losses whose differences from the standard reference path loss are smaller than an offset indicated by a base station.

(12) In (11), the predetermined standard reference path loss may be a path loss having the smallest value among the path losses.

(13) In (7), the reference path losses may be selected by a number indicated by a predetermined parameter from among path losses having the smallest value of the path losses.

(14) In (7), the reference path losses may include a path loss having the smallest value among the path losses and path losses whose differences from the path loss having the smallest value are smaller than an offset indicated by a predetermined parameter.

(15) In (7), information to select the reference path losses may be transmitted from a base station through upper layer signaling or dynamic signaling.

(16) According to another embodiment of the present invention, there is provided an apparatus of eNodeB (eNB), the apparatus including a Coordinated Multi-Point (CoMP) scheduling unit selecting receiving points in a CoMP system, a Radio Frequency (RF) unit transmitting CoMP setting information to User Equipment (UE) and receiving uplink transmission from the UE, wherein uplink transmission power used for the uplink transmission is controlled based on an effective path loss calculated by using at least one of path losses between the UE performing the uplink transmission and points in the CoMP system.

(17) In (16), the CoMP setting information includes information indicating the selected receiving points, and wherein the effective path loss is calculated based on path losses for the selected receiving points.

(18) According to another embodiment of the present invention, there is provided an apparatus of User Equipment (UE), the apparatus including a path loss calculating unit calculating path losses for transmission points in a Coordinated Multi-Point (CoMP) system and calculating an effective path loss based on at least one of the path losses and a power control unit performing uplink power control based on the effective path loss, wherein the effective path loss is calculated based on a predetermined number of reference path losses selected among the path losses.

(19) In (18), the reference path losses are path losses for receiving points indicated by a base station among the path losses.

According to the present invention, uplink transmission power control may be effectively performed when uplink JR CoMP applies.

According to the present invention, when performing uplink transmission power control, the uplink CoMP system may conduct exact power control by reflecting the path losses for the plurality of receiving points.

According to the present invention, path losses that need to be considered for power control among path losses for the plurality of receiving points may be effectively selected in order to perform effective power control.

According to the present invention, adaptive power control may be conducted corresponding to the type of control information that is transmitted from the base station to the user equipment.

DETAILED DESCRIPTION OF THE ILLUSTRATED EMBODIMENTS

Figure 1:
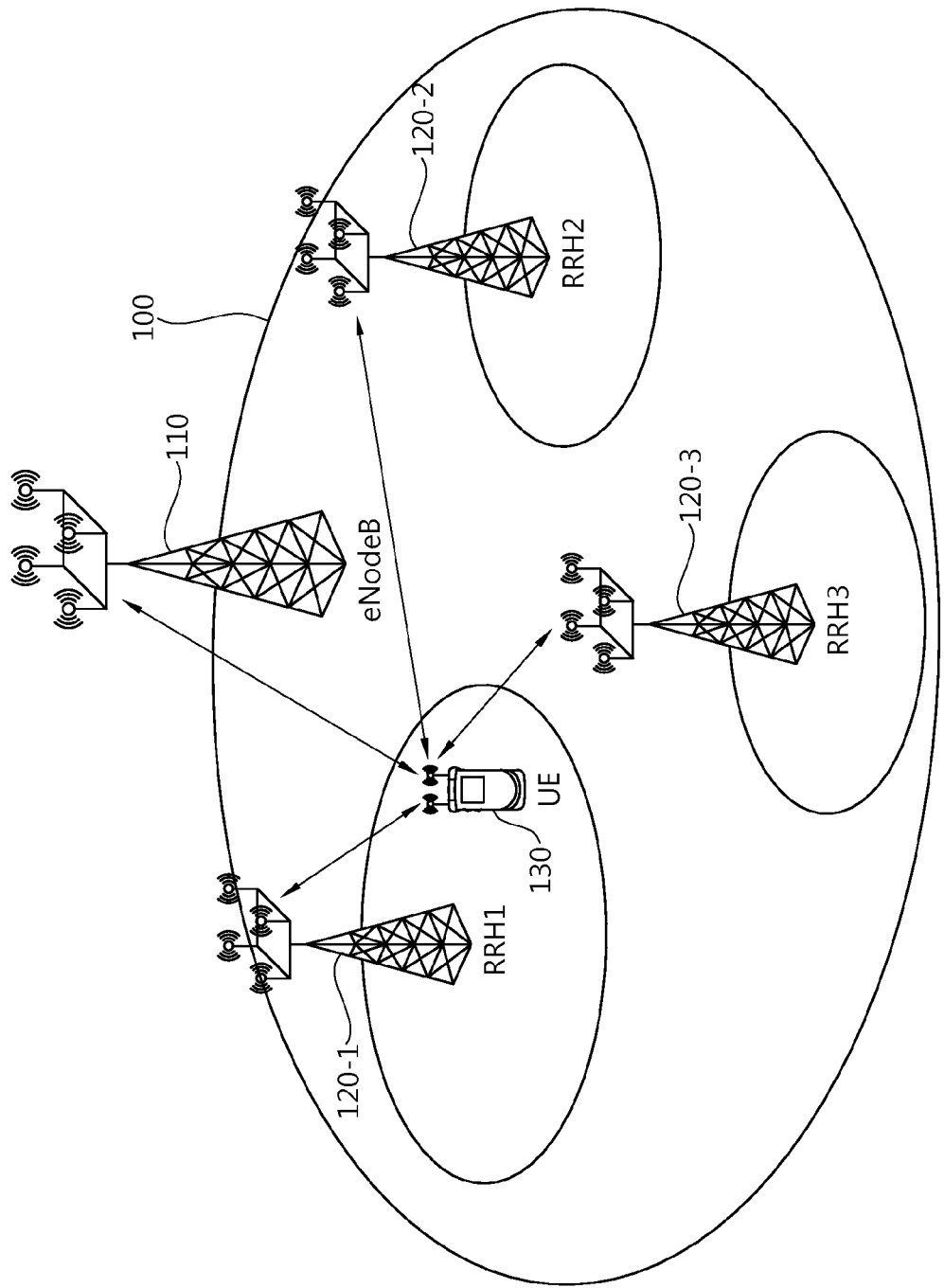
FIG. 1 is a view schematically illustrating a CoMP system.

Hereinafter, some embodiments will be described in greater detail with reference to the accompanying drawings. The same denotations are used to denote the same elements throughout the drawings. When determined to make the gist of the invention unclear, the specific description on the known configurations or functions will be omitted.

Hereinafter, a wireless communication network is described. Tasks may be done in the wireless communication network when the network is controlled by a system (e.g., base station) that is in charge of the wireless communication network or when data transmission is in progress. Or, such tasks may also be done by user equipment in the wireless network.

User equipment (hereinafter, "UE") may be stationary or mobile and may be referred to by other names, such as MS (Mobile Station), MT (Mobile Terminal), UT (User Terminal), SS (Subscriber Station), wireless device, PDA (Personal Digital Assistant), wireless modem, or handheld device.

Base station generally refers to a station that communicates with UE, and may be also called by other names, such as eNB (evolved-NodeB), BTS (Base Transceiver System), or access point.

Each base station provides a communication service in a specific geographical area (generally referred to as "cell"). The cell may be divided into a plurality of regions (referred to as "sectors"). A plurality of transmission terminals may constitute one cell.

In 3GPP LTE, a radio frame consists of 20 slots (#0 to #19). One subframe consists of two slots, each of which may include a plurality of symbols in the time domain. For example, in case of 3GPP LTE which uses OFDMA (Orthogonal Frequency Division Multiple Access) for downlink (DL), the symbol may be an OFDM (Orthogonal Frequency Division Multiplexing) symbol. The number of OFDM symbols included in one slot may vary depending on the length of CP (Cyclic Prefix).

The downlink subframe may be divided into a control region and a data region in the time domain. The data region is assigned with a data transmission channel, such as PDSCH (Physical Downlink Shared CHannel), and the control region is assigned with a control channel, such as PDCCH (Physical Downlink Control CHannel). Control information transmitted through PDCCH is referred to as downlink control information (DCI).

The uplink subframe includes two slots on a time axis, and each slot includes seven SC-FDMA (Single Carrier-Frequency Division Multiple Access) symbols. The uplink subframe includes PUSCH (Physical Uplink Shared CHannel) for transmitting uplink data on a frequency axis and PUCCH (Physical Uplink Control Channel) for transmitting uplink control information. PUCCH includes HARQ (Hybrid Automatic Repeat Request) acknowledgement or scheduling request.

Meanwhile, the MIMO (Multi-Input Multi-Output) system, which is also called "multi-antenna system", enhances data transmission efficiency by using a multi-transmission antenna and a multi-reception antenna.

MIMO technologies include transmit diversity, spatial multiplexing, and beamforming.

Transmit diversity is a technology of increasing transmission reliability by transmitting the same data through each of antennas constituting the multi-transmission antenna. Spatial multiplexing is a technology of being able to transmit high-speed data without increasing system bandwidth by simultaneously transmitting different data using a multi-transmission antenna. Beamforming is used to increase SINR (Signal to Interference plus Noise Ratio) of a signal by adding a weight to each of antennas constituting the multi antenna depending on the channel state. At this time, the weight may be represented as a weight vector or weight matrix, which is referred to as precoding vector or precoding matrix.

The MIMO system may perform transmission/reception between UE and multiple cells and/or multiple points by applying CoMP (Coordinated Multi Point) scheme. The CoMP system is also referred to as a coordinated multi-transmission/reception system. In the CoMP system, the point means a set of transmission antennas or reception antennas that are geographically co-located. Even sectors which are in the same site might be corresponding to different points, respectively. For example, the point may be UE, eNB, or RRH. eNB may be divided into RF (Radio Frequency) portion and base band portion, and RRH (Remote Radio Head) is a device constituted only of the RF portion. Accordingly, RRH may include, other than the RF circuitary, an A/D (Analogue to Digital) converter, or an up/down converter. The RF portion may be separated and made small, so that coverage may expand without separately installing a base station. RRH may be connected to eNB via a fibre.

FIG. 1 is a view schematically illustrating a CoMP system. Referring to FIG. 1, in a region 100 to which CoMP applies, UE 130 performs communication with multiple points including eNB 110 and RRHs 120-1, 120-2, and 120-3.

In the downlink CoMP, the CoMP cooperated set refers to a set of points that directly/indirectly attends (geographically separated) data transmission for any UE in a time-frequency resource. A region where cooperation may be done through the CoMP cooperated set may be defined as well. The CoMP cooperated set may be transparent or not with respect to the corresponding UE. At this time, "directly attend the data transmission" means that the corresponding point actually transmits and/or receives data in the corresponding time-frequency resource. "indirectly attend the data transmission" means that the corresponding point, as a candidate point for data transmission, does not actually transmit data but contributes to determining scheduling/beamforming in the corresponding time-frequency resource.

The downlink CoMP schemes may be categorized into joint processing (hereinafter, 'JP') and coordinated scheduling/beamforming (hereinafter, 'CS/CB'), and JP and CSCB may be combined with each other.

In case of JP, data for UE is available for at least one point in the CoMP cooperated set in a time-frequency resource. JT means that in the time-frequency resource data is transmitted to one UE or a plurality of UEs to multiple points belonging to the CoMP cooperated set in the time-frequency resource. JP includes JT (Joint Transmission) and DPS (Dynamic Point Selection).

In case of CS, data is transmitted from one point in the CoMP cooperated set in the time-frequency resource. The user scheduling is determined by cooperation between points in the corresponding CoMP cooperated set. At this time, available points are dynamically or semi-statically selected. CB is also determined by cooperation between the points in the corresponding CoMP cooperated set. Interference that occurs between UEs in the neighboring cells may be avoided by CB (Coordinated Beamforming).

In the uplink CoMP, CoMP reception is done between the multiple points geographically separated from each other. In the uplink CoMP, the CoMP cooperated set means a set o points configured (geographically separated) for receiving data from UE. CoMP receiving point(s) refer to point(s) or a set of points that receive data from UE, and CoMP receiving point(s) may be subset(s) of the CoMP cooperated set.

The uplink CoMP schemes may be categorized into joint reception (hereinafter, 'JR') and coordinated scheduling and beamforming (hereinafter, 'CS/CB').

In case of JR, PUSCH transmitted by UE is jointly received by multiple points (some or all in the CoMP cooperated set) at a time. JR may enhance quality of the received signal. In case of JR, the CoMP receiving points may include multiple points in the CoMP cooperated set per subframe with respect to a specific frequency resource. In case of JR, all the points in the CoMP cooperated set do not jointly detect a signal from UE as receiving points. eNB may select receiving points to jointly detect the received signal from among the points in the CoMP cooperated set.

In case of CS/CB, user scheduling and precoding selection determination are done by cooperation between points corresponding to the CoMP cooperated set. At this time, data is transmitted from UE targeting only one point. In case of CS/CB, a single point in the CoMP cooperated set becomes a CoMP receiving point per subframe with respect to a specific frequency resource.

JR and/or CS/CB is applied to the uplink CoMP so that interference may be controlled and coverage may be enhanced.

Meanwhile, the uplink transmission performance is sensitive to a setting of uplink power control (PC). In general, the uplink power control is achieved by a combination of open-loop power control (OLPC) and closed-loop power control (CLPC). Here, the open-loop power control is done according to a predetermined rule regardless of the channel state. The open-loop power control is mainly used to roughly set the transmission power of UE and compensates for a slow change in path loss including shadowing so that a predetermined average reception power is obtained for all the UEs in the corresponding cell. On the contrary, the closed-loop power control is performed while reflecting a channel state. The closed-loop power control is used to adjust a UE-specific power setting, and this power control may alleviate an impact that comes from a quick change in channel state and may optimize the general network performance.

Power control for the uplink, e.g., PUSCH, may be conducted based on the path loss calculated by UE and a TPC (Transmit Power Control) command transmitted from eNB.

For example, in case that PUCCH transmission is not simultaneously performed as PUSCH transmission in the subframe i for serving cell c, UE may conduct PUSCH transmission with the PUSCH transmission power calculated in Math Figure 1:

Math Figure 1

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{cases} [dBm]$$ [Math. 1]

Figure 2:
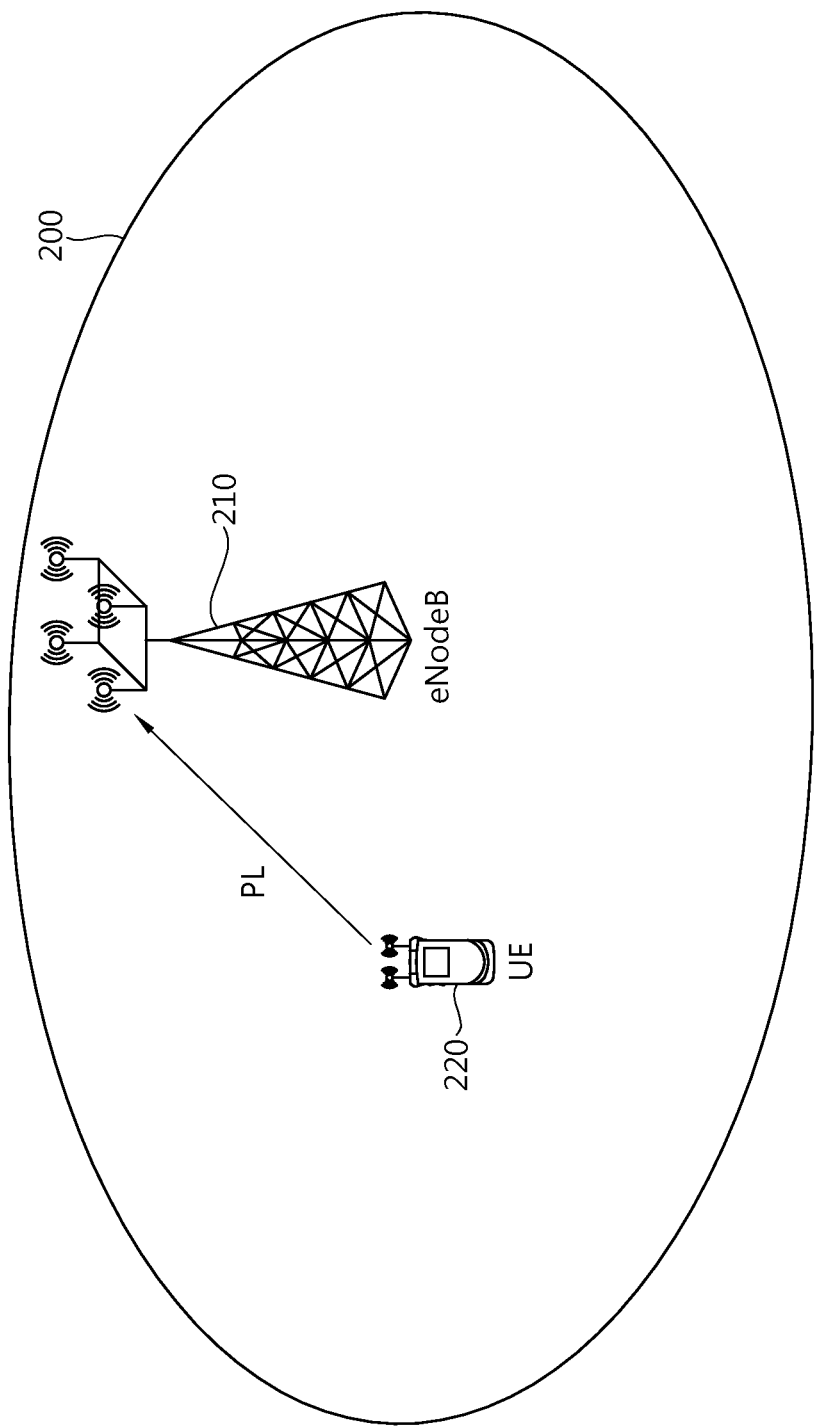
FIG. 2 is a view schematically illustrating an example where in case of a single cell, that is, non-CoMP, uplink power control is conducted.

Further, in case that PUCCH transmission is simultaneously performed as PUSCH transmission in the subframe i for serving cell c, UE may perform PUSCH transmission with the PUSCH transmission power calculated in Math Figure 2:

Math Figure 2

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{cases} [dBm]$$ [Math. 2]

In Math Figures 1 and 2, $P_{CMAX,c}(i)$ is UE transmission power set in the subframe i for serving cell c.

$\hat{P}_{CMAX,c}(i)$ is a linear value of $P_{CMAX,c}(i)$, and $\hat{P}_{PUCCH}(i)$ is a linear value of PUCCH transmission power $P_{PUCCH}(i)$. $M_{PUSCH,c}(i)$ is a bandwidth of PUSCH resource allocation that is represented as the number of effective resource blocks with respect to the subframe i and serving cell c.

$P_{O\_PUSCH,c}(j)$ is a sum of $P_{O\_NOMINAL\_PUSCH,c}(j)$ and $P_{O\_UE\_PUSCH,c}(j)$ given by the upper layer. When j=0, $P_{O\_NOMINAL\_PUSCH,c}(j)$ and $P_{O\_UE\_PUSCH,c}(j)$ represent values for PUSCH (re)transmission corresponding to semi-persistent grant. When j=1, $P_{O\_NOMINAL\_PUSCH,c}(j)$ and $P_{O\_UE\_PUSCH,c}(j)$ represent values for PUSCH (re)transmission corresponding to dynamic scheduled grant. When j=2, a value of $P_{O\_NOMINAL\_PUSCH,c}(j)$ is 0, and $P_{O\_UE\_PUSCH,c}(j)$ may be transferred through upper layer signaling.

When j is 0 or 1, $\alpha_c(j)$ is a parameter transmitted through upper layer signaling, which may have a predetermined value, and when j=2, $\alpha_c(j)$ may be 1.

$PL_c$ is a downlink path loss estimate, which may be calculated by UE with respect to serving cell c. $PL_c$ is a difference between RSRP (Reference Signal Receive Power) and the downlink reference signal power (referenceSignalPower) transmitted through the upper layer signaling, and this may be calculated in Math Figure 3. At this time, RSRP is higher layer filtered RSRP and may be set by the upper layer parameter.

Figure 3:
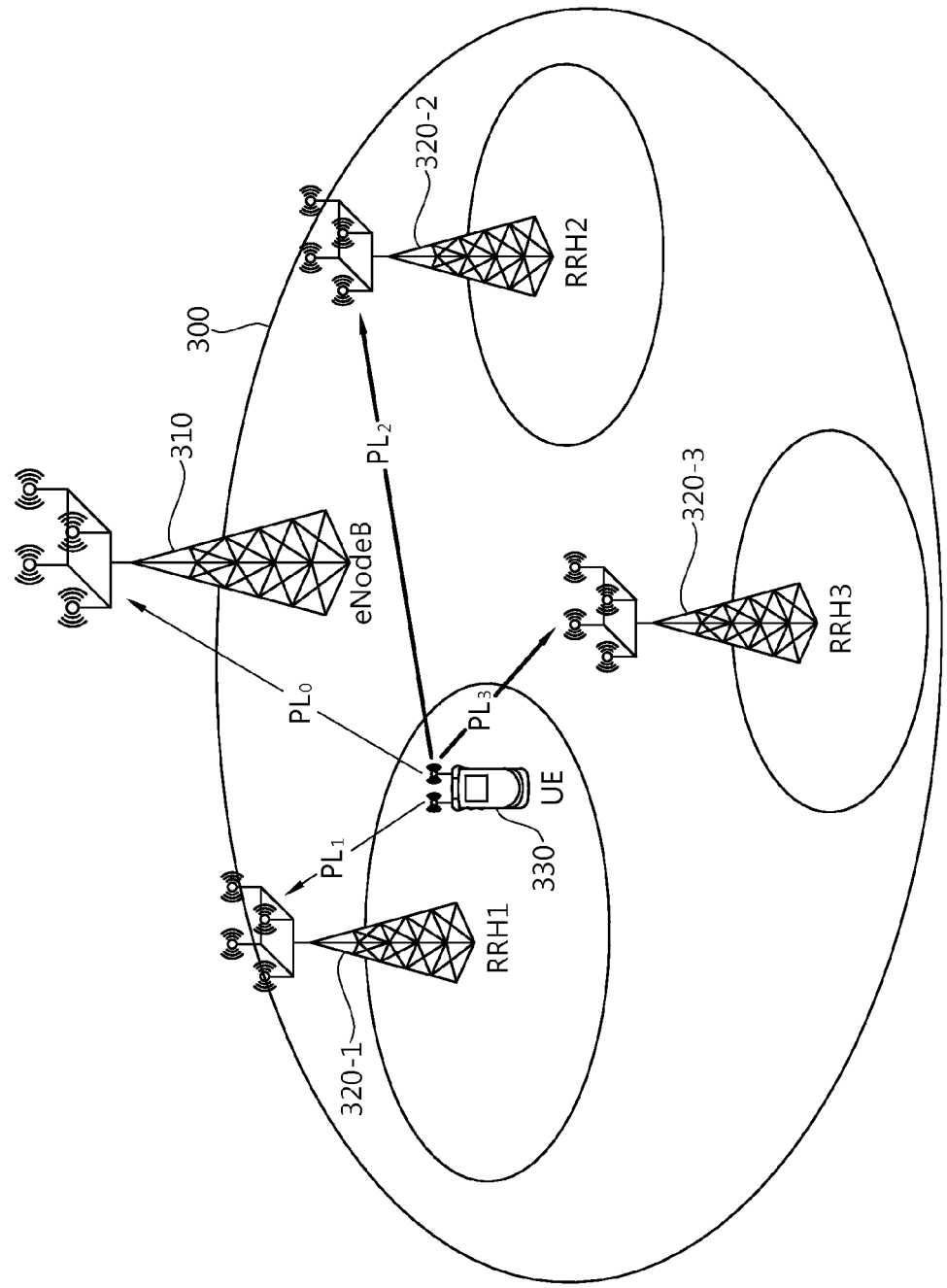
FIG. 3 schematically illustrates an example where among uplink CoMP schemes, JR applies in the system according to the present invention.

Math Figure 3

$$PL_c = \text{referenceSignalPower} - \text{RSRP}$$ [Math. 3]

In Math Figure 3, referenceSignalPower may be transmitted to UE through the upper layer signaling. RSRP may be calculated by UE based on the received reference signal.

$\Delta_{TF,c}(i)$ is set through a parameter provided by the upper layer in the subframe i for serving cell c, and $f_c(i)$ is set b a TPC command transmitted from eNB.

Figure 4:
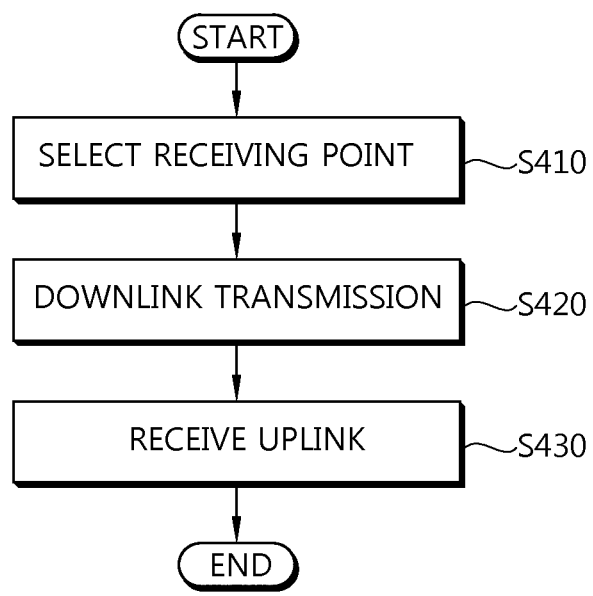
FIG. 4 is a flowchart schematically illustrating the operation of eNB in a system according to the present invention.

Further, the transmission power of uplink control channel may be calculated in Math Figure 4:

Math Figure 4

$$P_{PUCCH}(i) = \min \begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases}$$ [Math. 4]

In Math Figure 4, $P_{CMAX,c}(i)$ is transmission power set in the subframe i for serving cell c, and $P_{O\_PUCCH,c}(j)$ is a sum of $P_{O\_NOMINAL\_PUCCH,c}(j)$ and $P_{O\_UE\_PUCCH,c}(j)$ given by the upper layer with respect to serving cell c.

$PL_c$ may be calculated in Math Figure 3 as described above.

$h(n_{CQI}, n_{HARQ}, n_{SR})$ is a value according to PUCCH format, wherein $n_{CQI}$ corresponds to the number of information bits for channel quality information, and $n_{SR}$ has a value of 0 or 1 according to whether SR (Scheduling Request) has been set in the corresponding subframe (i) with respect to UE that does not have an associated transport block for an uplink data channel (UL-SCH). $n_{HARQ}$ may have a predetermined value or the number of HARQ bits which is transmitted according to whether UE has been configured with a single serving cell.

$\Delta_{F\_PUCCH}(F)$ may be set by the upper layer signaling corresponding to PUCCH format (F), and $\Delta_{TxD}(F)$ may be set by the upper layer signaling according to the PUCCH format (F) and the number of transmission antenna ports.

g(i) refers to a current PUCCH power control adjustment state, which may be calculated based on the TPC command transmitted from eNB and the previous power adjustment state.

Referring to Math Figures 1 to 4, the uplink transmission power may be determined as the smaller of preset transmission power (e.g., $P_{CMAX}$, $10\log_{10}(\hat{P}_{CMAX,c}(i) - \hat{P}_{PUCCH}(i)))$ and transmission power calculated by UE based on the path loss (PL) measured by UE and the TPC command transmitted from eNB (e.g., TPC-based $f_c$, g).

Meanwhile, in case of a single cell, there is one receiving point (Rx point) for the uplink, and thus, each path loss is compensated for uplink power control.

FIG. 2 is a view schematically illustrating an example where in case of a single cell, that is, non-CoMP, uplink power control is conducted. Referring to FIG. 2, in a cell 200, UE 220 receives uplink transmission with respect to a single receiving point, eNB 210, and compensates for path loss between UE 220 and eNB 210 for power control.

On the contrary, in case of JR in the uplink CoMP, uplink signals received by several RRHs are detected.

FIG. 3 schematically illustrates an example where among uplink CoMP schemes, JR applies in the system according to the present invention.

As described above, in case of JR, there may be a plurality of receiving points, and a different path loss between UE and each receiving point may occur. In the example illustrated in FIG. 3, in the region 300 where uplink CoMP applies, a CoMP cooperated set is constituted of eNB 310 and RRHs 320-1 to 320-3.

eNB 310 and RRHs 320-1 to 320-3 jointly receive a signal transmitted from UE 330. As shown in FIG. 3, path losses ($PL_0$~$PL_3$) may be calculated between desired UE 330 and each of the receiving points 310, 320-1 to 320-3. The path losses for the receiving points, respectively, may differ from each other. Accordingly, the open-loop power control scheme based on the path loss between UE and a single receiving point cannot sufficiently obtain an uplink CoMP gain.

There are disclosed herein a method of, in a case where JR of uplink CoMP applies, determining a plurality of path losses to be used to determine uplink transmission power among path losses between UE and each receiving point and a method of calculating the optimal effective path loss (hereinafter, '$PL_E$') to be used to determine the uplink transmission power based on the determined plurality of path losses. Path losses for the plurality of receiving points are reflected to calculate $PL_E$ through which uplink transmission power is determined, so that gain of JR of uplink CoMP may be enhanced.

Hereinafter, embodiments of the present invention are described in detail with reference to the accompanying drawings.

FIG. 4 is a flowchart schematically illustrating the operation of eNB in a system according to the present invention.

Referring to FIG. 4, first, eNB selects a receiving point to receive a signal transmitted from UE in uplink JR (Joint Reception) CoMP (S410). As described above, all the points (e.g., RRHs) in the CoMP cooperated set do not participate in detection of the received signal. Accordingly, among the points constituting the CoMP cooperated set, eNB may select a receiving point to attend reception detection. To optimize power control, the receiving point may be selected considering the path loss between each point and UE.

When the information regarding the receiving point is transmitted to UE is referred to as NTM (Non-Transparent Mode). When information regarding which receiving point has been selected is not transmitted but additional information is transferred, such as the number of received points, path loss value or offset to be selected as the receiving point, is referred to as STM (Semi-Transparent Mode). When neither the information regarding which receiving point has been selected nor the additional information is transmitted to UE is referred to as TM (Transparent Mode).

In case of NTM, the information regarding which receiving points have been selected is transmitted to UE through upper layer signaling, such as RRC message. In case of STM, additional information may be transmitted to UE through the upper layer signaling, such as RRC message or may be dynamically transmitted to UE through a physical channel, such as PDCCH.

eNB receives an uplink signal from UE (S430). The uplink transmission from UE may be performed by transmission power reflecting path loss for a plurality of receiving points.

Figure 5:
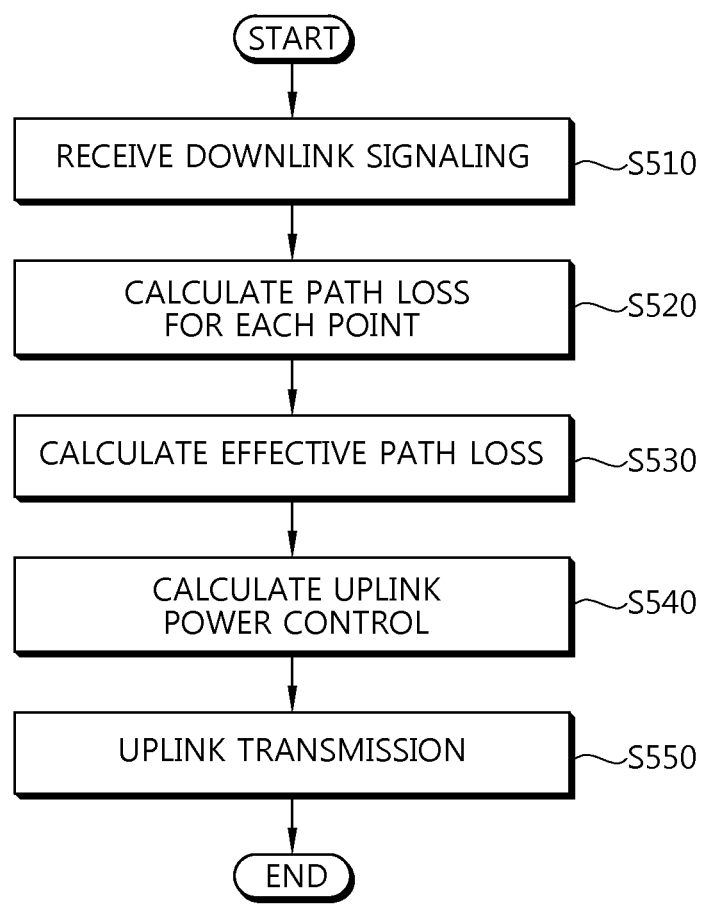
FIG. 5 is a flowchart schematically illustrating the operation of UE in a system according to the present invention.

FIG. 5 is a flowchart schematically illustrating the operation of UE in a system according to the present invention.

Referring to FIG. 5, UE receives a downlink signal from each transmission point (S510). The downlink signal may include a reference signal to grasp a channel state. In case of NTM, information regarding the uplink receiving point may be transmitted through upper layer signaling from eNB. In case of STM, additional information may be transmitted through upper layer signaling or signaling through a physical layer.

UE may calculate a path loss for each point (S520). In the uplink CoMP, when the CoMP cooperated set consists of N points (e.g., RRHs), the path loss between a desired UE and receiving point may differ for each point. When the path loss between UE and the kth point (1≤k≤N) in the CoMP cooperated set is $PL_k$, UE may calculate the path loss {$PL_1$, $PL_2$, ..., $PL_N$} for each point k.

The path loss PLk between UE and the kth point may be calculated in Math Figure 5:

Math Figure 5

$$PL_k = \text{referenceSignalPower}(k) - \text{RSRP}(k) \qquad \text{Math. 5}$$

In Math Figure 5, referenceSignalPower(k) is a parameter that represents transmission power of a downlink reference signal, such as CRS (Cell-specific Reference Signal) received from the kth point in the CoMP cooperated set. referenceSignalPower(k) may be included in the PDSCH configuration information and transmitted to UE through upper layer signaling.

RSRP(k) may be calculated by UE based on the reference signal received from the kth point in the CoMP cooperated set. RSRP may be defined as a linear average for power contribution of resource elements that carry the reference signal, such as CRS in the considered measurement frequency bandwidth. UE obtains measurement samples by filtering in the physical layer level and filters the measurement samples in the upper layer level. This is referred to as upper layer filtered RSRP. Filtering may be conducted by the upper layer of UE, for example, RRC (Radio Resource Control) layer.

UE calculates an effective path loss for uplink power control (S530). In case of NTM, UE may calculate PLE by reflecting PL for each receiving point based on information received from eNB. In case of STM, UE may select PLs for predetermined points based on the additional information received from eNB and may calculate $PL_E$ by reflecting the selected PLs. In case of TM, UE may select PLs for predetermined points according to what is previously set and may calculate PLE by reflecting the selected PLs.

UE may calculate power for the uplink transmission based on $PL_E$ (S540). The uplink transmission power may be calculated based on the TPC command transmitted from eNB and the optimal effective path loss ($PL_E$) calculated by UE similar to Math Figure 1, 2, and 4. For example, $PL_E$ corresponds to $PL_c$ in Math Figures 1, 2, and 4.

Figure 6:
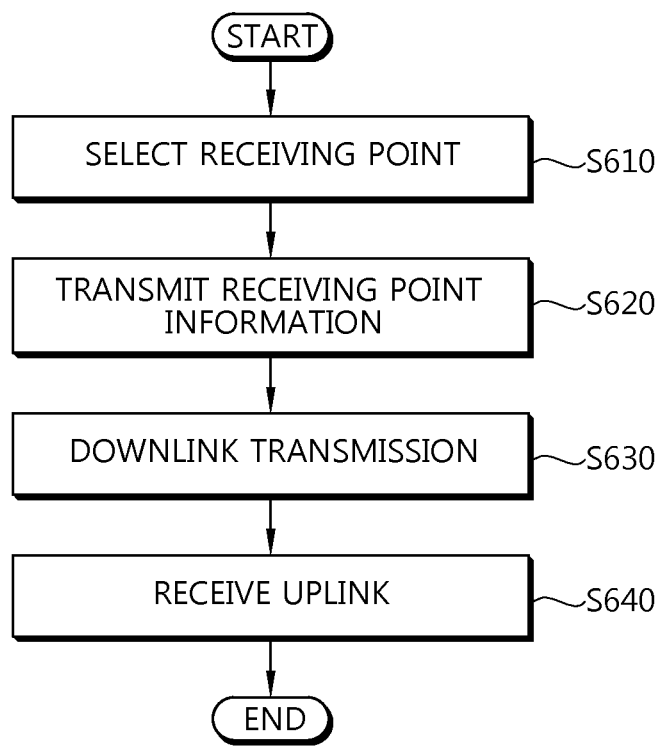
FIG. 6 is a flowchart schematically illustrating the operation of eNB in a system according to the present invention in case of NTM.

Math Figure 6 shows an example of calculating PUSCH transmission power in the system according to the present invention.

Math Figure 6

$$P_{PUSCH}(i) = \min\{P_{CMAX}, 10\log_{10}(M_{PUSCH}(i)) + P_{O\_PUSCH}(j) + \alpha(j) \cdot PL_E + \Delta_{TF}(i) + f(i)\} \text{ [dBm]} \qquad \text{[Math. 6]}$$

As described in connection with Math Figures 1, 2, and 4, $P_{CMAX}$ is preset power, and $M_{PUCCH}(i)$ is the bandwidth of PUCCH resource allocation in the ith subframe. As described above, $P_{O\_PUSCH}(j)$, $\alpha(j)$, $\Delta_{TF}(i)$ are values set through the upper layer signaling, and f(i) is a value set by TPC transmitted through DCI.

UE performs uplink transmission using transmission power calculated in step S530 (S550).

Meanwhile, to calculate the effective path loss $PL_E$, M path losses, i.e., {$PL_{i1}$, $PL_{i2}$, ..., $PL_{iM}$}, may be determined.

These M path losses may be selected from among N path losses {$PL_1$, $PL_2$, ..., $PL_N$} between UE and N points. As described below, in case of NTM, M path losses may be indicated by eNB. In case of STM, the M path losses may be determined by UE based on additional information. Further, in case of TM, the M path losses may be determined by UE according to a predetermined setting. $PL_E$ may be calculated based on thusly determined M path losses {$PL_{i1}$, $PL_{i2}$, ..., $PL_{iM}$}.

Figure 7:
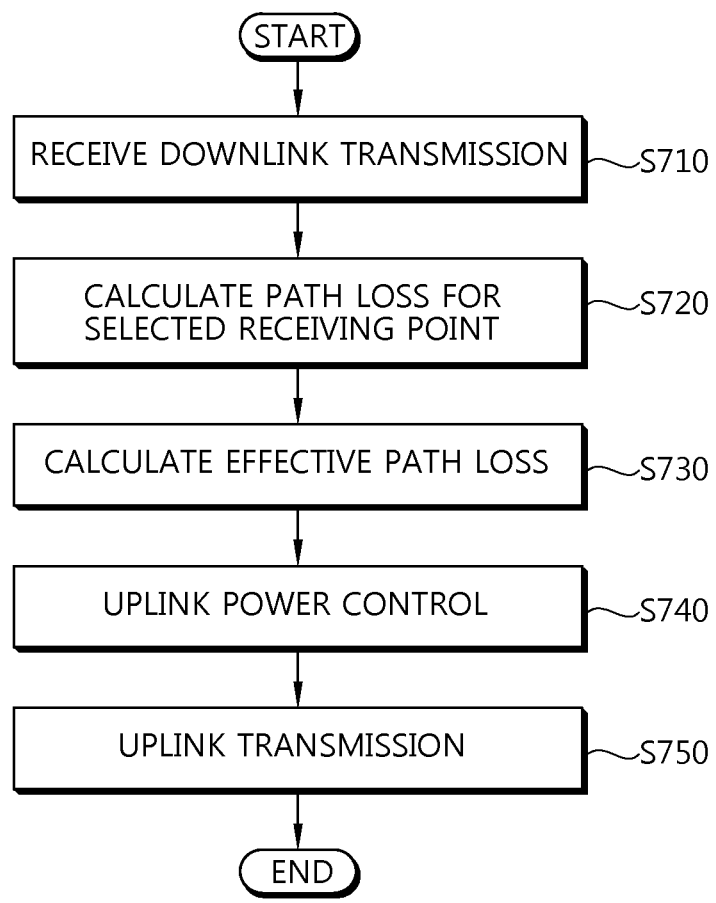
FIG. 7 is a flowchart schematically illustrating the operation of UE in a system according to the present invention in case of NTM.

For example, assuming uniform detection performance, the effective path loss may be obtained as a reciprocal of a sum of reciprocals of the path losses. That is, when each path loss measured in mW is $\{PL_{i1W}, PL_{i2W}, \ldots, PL_{iMW}\}$, $PL_{EW}$ has a unit [mW] and may be represented in Math Figure 7:

Math Figure 7

$$\frac{1}{PL_{EW}} = \frac{1}{PL_{i1W}} + \frac{1}{PL_{i2W}} + \ldots + \frac{1}{PL_{iMW}} \qquad \text{[Math. 7]}$$

Accordingly, the effective path loss becomes smaller than the path loss for a link between each point and UE. Accordingly, in JR CoMP, the uplink transmission power calculated using the effective path loss also decreases.

Figure 8:
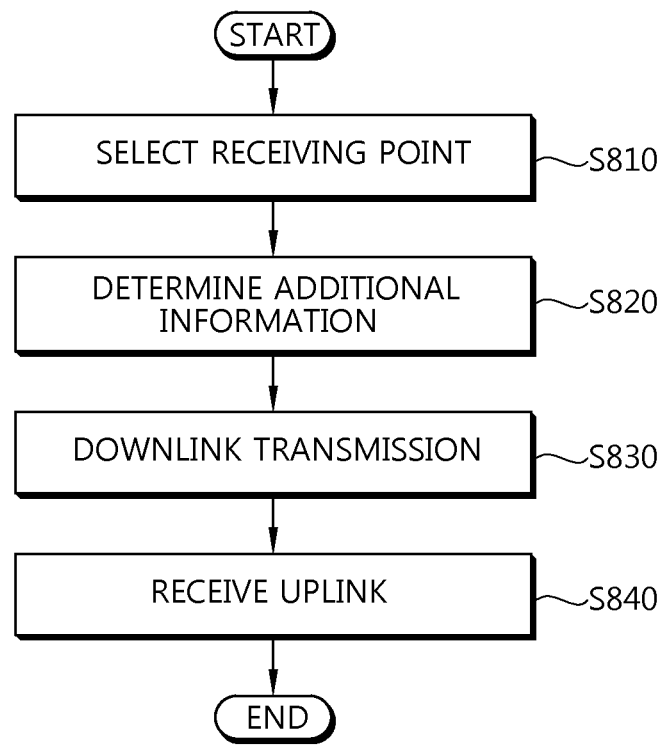
FIG. 8 is a flowchart schematically illustrating the operation of eNB in a system according to the present invention in case of STM.

Converted in dBm, Math Figure 7 has a unit [dBm] and may be represented in Math Figure 8:

Math Figure 8

$$PL_E = -10\log_{10}\left(10^{-\frac{PL_{i1}}{10}} + 10^{-\frac{PL_{i2}}{10}} + \ldots + 10^{-\frac{PL_{iM}}{10}}\right) \qquad \text{[Math. 8]}$$

In case that only one point (i1) is selected as a receiving point, it can be seen that the effective path loss is the same as the path loss for the corresponding point ($PL_E = PL_{i1}$).

In case of a homogeneous network, the downlink transmission power is the same for each transmission point. Accordingly, the effective path loss for JR CoMP may be also calculated in Math Figure 9. Also in Math Figure 9, $PL_E$ is in [dBm].

Figure 9:
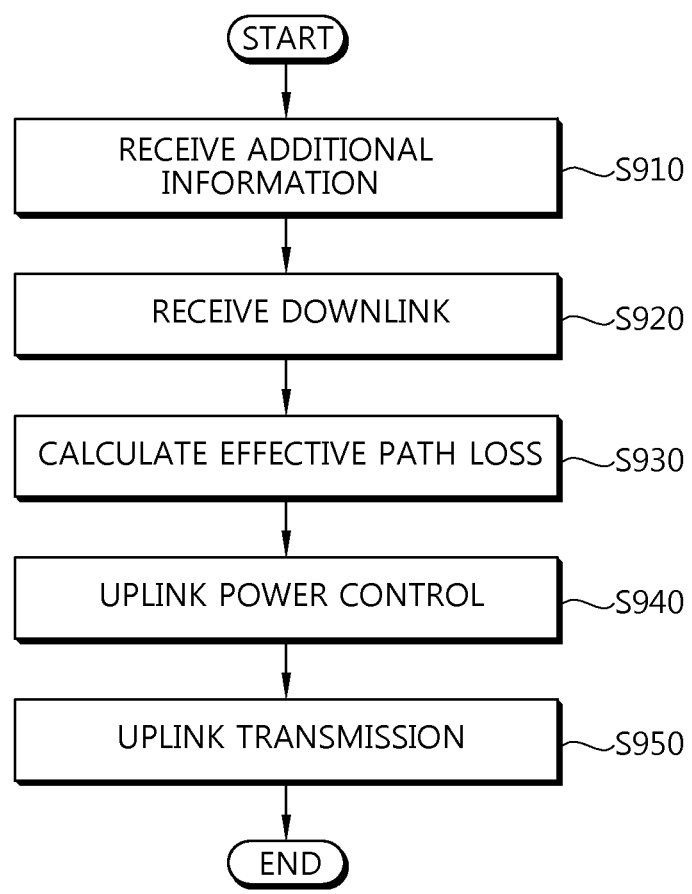
FIG. 9 is a flowchart schematically illustrating the operation of UE in a system according to the present invention in case of STM.

Math Figure 9

$$PL_E = referenceSignalPower - \qquad \text{[Math. 9]}$$
$$10\log_{10}\left(10^{-\frac{RSRP_{i1}}{10}} + \ldots + 10^{-\frac{RSRP_{iM}}{10}}\right)$$

Like in Math Figure 6, similar to Math Figures 1, 2, and 4, UE may perform uplink power control that calculates uplink transmission power based on the effective path loss ($PL_E$) and the TPC command transmitted from eNB.

Meanwhile, to raise transmission efficiency, as described above, the uplink transmission power determined by reflecting the effective path loss may be made to satisfy a predetermined condition. For example, as a condition, the uplink transmission power P calculated by reflecting the effective path loss ($PL_E$) needs to be smaller than predetermined threshold power Pthreshold1 that is determined by DMRS (Demodulation Reference Signal) or link budget. Further, to guarantee that the uplink transmission is detected at the receiving terminal, as the condition, the uplink transmission power P calculated by reflecting the effective path loss needs to be smaller than a preset value $P_{CMAX}$ for the uplink transmission power and equal to or larger than predetermined threshold power $P_{threshold2}$. For example, as the condition, the transmission power PPUSCH of the uplink data channel is equal to or larger than the predetermined threshold power $P_{threshold2}$ and smaller than preset maximum power $P_{CMAX}$.

Hereinafter, a method of calculating M PLs $\{PL_{i1}, PL_{i2}, \ldots, PL_{iM}\}$ to be reflected in the effective path loss $PL_E$, in case of NTM, STM, and TM, in the system according to the present invention is described.

In Case of NTM (Non-Transparent Mode)

In case of NTM, as described above, information on which receiving points have been selected by eNB may be transmitted to UE through dynamic signaling, such as DCI, over PDCCH or upper layer signaling, such as RRC message.

FIG. 6 is a flowchart schematically illustrating the operation of eNB in a system according to the present invention in case of NTM.

Referring to FIG. 6, eNB first selects receiving points to jointly detect a signal transmitted from UE in JR CoMP (S610).

eNB transmits information on the selected receiving points to UE (S620). The information on the receiving points may be information that specifically indicates the selected receiving points. For example, in case that eNB selects M receiving points $\{P_{i1}, P_{i2}, \ldots, P_{iM}\}$, the information on the receiving points may indicate the selected points $\{P_{i1}, P_{i2}, \ldots, P_{iM}\}$. The information on the receiving points may be transmitted to UE through upper layer signaling, such as RRC, or may be dynamically transmitted to UE through a physical channel.

Accordingly, UE may be exactly aware of the selected receiving points.

eNB may perform downlink transmission alone or in combination with other points constituting CoMP (S630). The downlink transmission from the multiple points constituting CoMP may include a TPC command and/or a reference signal that reflects the channel state so that UE may determine the uplink power control.

eNB receives the uplink transmission from UE (S640). The uplink transmission from UE is jointly detected by the receiving points selected by eNB.

FIG. 7 is a flowchart schematically illustrating the operation of UE in a system according to the present invention in case of NTM.

Referring to FIG. 7, UE receives a downlink signal from CoMP transmission points (S710). In case of NTM, UE may receive information regarding the receiving points from eNB through upper layer signaling, such as RRC message, or through dynamic signaling over PDCCH. Further, UE may receive DCI (Downlink Control Information) including TPC (Transmit Power Control) command over PDCCH from eNB. Further, UE receives a reference signal that may measure the channel state from each transmission point.

UE calculates the path loss for the receiving point (S720). As described above, UE may be exactly aware of the receiving point in the uplink JR CoMP based on the information regarding the receiving points transmitted from eNB. Accordingly, in case that information on the M selected receiving points ($P_{i1}, P_{i2}, \ldots, P_{iM}$) is transmitted from eNB, as described in connection with Math Figure 5, UE may calculate the path loss ($PL_{i1}, PL_{i2}, \ldots, PL_{iM}$) for each receiving point.

UE calculates the effective path loss based on the path loss for each receiving point (S730). UE may calculate the effective path loss $PL_E$ based on the path loss ($PL_{i1}, PL_{i2}, \ldots, PL_{iM}$) for each receiving point. The method of calculating the effective path loss based on M path losses has been described above.

UE performs uplink power control based on the TPC command and the effective path loss (S740). The method of performing the uplink power control to determine transmission power has been described above.

UE transmits a signal to each receiving point using the calculated uplink transmission power (S750).

In Case of STM (Semi-Transparent Mode)

In case of STM, eNB may dynamically change the receiving point of the uplink JR CoMP. As described above, in STM, eNB does not correctly indicate a receiving point and transfers parameters associated with power control to UE through the upper layer signaling, such as RRC message or through dynamic signaling, such as DCI over PDCCH. Based on the parameters transmitted from eNB, UE calculates the path loss to approach the optimal power control.

In case of STM, UE cannot be aware of exact receiving point, but may enhance power control performance in uplink JR CoMP based on the additional information transmitted from eNB. As the additional information transmitted from eNB to UE, the following may be considered: (1) the minimum number of path losses between UE and transmission points that is used to calculate the effective path loss; and (2) power offset values of the path losses used to calculate the effective path loss.

(1) In Case the Minimum Path Loss Count M is Signaled from eNB to UE

Assume that M is the minimum number of path losses necessary to calculate the effective path loss among path losses between UE and the receiving points when calculating the effective path loss $PL_E$ for the optimized power control in STM. In other words, M points which have a high chance of being selected as receiving points of uplink JR CoMP are selected and based on M path losses between UE and corresponding points the effective path loss $PL_E$ may be calculated.

eNB determines M. eNB transmits the determined M to UE through upper layer signaling or dynamic signaling. eNB may configure a PL indication bit that indicates M and may transmit it to UE. The PL indication bit may be transmitted to UE through upper layer signaling, such as RRC message or dynamic signaling such as DCI over PDCCH.

Table 1 shows examples of the PL indication bits and M values indicated by the PL indication bits. In Table 1, the PL indication bit consists of two bits as an example. Information regarding a matching relationship between the PL indication bit and M as in Table 1 may be previously transmitted from eNB through the upper layer signaling, such as RRC message.

TABLE 1

| Indication bit | M |
|---|---|
| 00 | 1 |
| 01 | 2 |
| 10 | 3 |
| 11 | 4 |

As in Table, in case that allocation of two bits to the PL indication bit is deemed to be excessive in consideration of the transmission amount, M may be indicated with one bit signaling by using the number of Rx sequence masks that scramble C-RNTI (Cell-Radio Network Temporary Identifier) in RRC check.

After receiving M from eNB through the PL indication bit, UE selects M path losses $\{PL_{i1}, PL_{i2}, \ldots, PL_{iM}\}$ among N path losses $\{PL_1, PL_2, \ldots, PL_N\}$ between UE and the points based on the received M. For example, UE may select the smallest M path losses among the N path losses.

Specifically, UE may calculate the path losses $\{PL_1, PL_2, \ldots, PL_N\}$ between UE and the points as in Math Figure 5. First, UE selects the smallest path loss $PL_{i1}$ among N path losses. That is, $PL_{i1}$ which satisfies $PL_{i1}=\min\{PL_1, PL_2, \ldots, PL_N\}$ is selected as the first path loss. Next, UE selects the smallest path loss $PL_{i2}$ among N−1 path losses other than $PL_{i1}$. That is, $PL_{i2}$ which satisfies $PL_{i2}=\min(\{PL_1, PL_2, \ldots, PL_N\}-\{PL_{i1}\})$ is selected as the second path loss. The same process repeats so that the smallest one of N−(M−1) path losses is selected as the Mth path loss last selected. That is, $PL_{iM}$ which satisfies $PL_{iM}=\min(\{PL_1, PL_2, \ldots, PL_N\}-\{PL_{i1}, PL_{i2}, \ldots, PL_{iM-1}\})$ is selected as the Mth path loss.

Accordingly, the kth selected path loss is $PL_{ik}=\min(\{PL_1, PL_2, \ldots, PL_N\}-\{PL_{i1}, \ldots, PL_{ik-1}\})$ ($1 \leq k \leq M$, $1 \leq M \leq N$).

UE calculates the effective path loss PLE based on the selected M path losses. The method of calculating the effective path loss $PL_E$ has been described in connection with Math Figures 8 and 9. For example, in case M is 1, the effective path loss becomes the smallest one among the N path losses $\{PL_1, PL_2, \ldots, PL_N\}$ ($PL_E=\min\{PL_1, PL_2, \ldots, PL_N\}$). If M is the same as N which is the number of receiving points constituting the uplink JR CoMP cooperated set, then the effective path loss is calculated based on all of the N path losses $\{PL_1, PL_2, \ldots, PL_N\}$.

(2) In Case Path Loss Power Offset is Signaled from eNB to UE

In such case, the path loss power offset $P_{offset}$ is transmitted from eNB to UE so that the effective path loss may be calculated to perform the optimized power control in STM. For example, when among the path losses $\{PL_1, PL_2, \ldots, PL_N\}$ between UE and the receiving points the smallest one is $PL_{i1}$, the path losses whose differences from $PL_{i1}$ are within a range of the offset $P_{offset}$ are path losses for the points which have a higher chance of being selected as the receiving points of the uplink CoMP JR, and thus, these path losses may be reflected when calculating the effective path loss $PL_E$.

eNB determines the path loss power offset $P_{offset}$. eNB configures a PL indication bit that indicates the offset $P_{offset}$ value. The PL indication bit may be included in the upper layer signaling, such as RRC message and transmitted to UE. Further, the PL indication bit may be also transmitted to UE through dynamic signaling, included in DCI over PDCCH.

Table 2 shows examples of the PL indication bits and $P_{offset}$ values indicated by the PL indication bits. In Table 2, the PL indication bit consists of two bits as an example. Information regarding a matching relationship between the PL indication bit and $P_{offset}$ value may be previously transmitted to UE from eNB through the upper layer signaling, such as RRC message.

TABLE 2

| Indication bit | $P_{offset}$ value |
|---|---|
| 00 | 3 dBm |
| 01 | 5 dBm |
| 10 | 7 dBm |
| 11 | 10 dBm |

According to $P_{offset}$ indicated by the indication bit as in Table 2, UE selects the smallest path loss which has the smallest value and path losses whose differences from the smallest path loss are within the range of $P_{offset}$ and may calculate the effective path loss based on the selected path losses.

Specifically, UE selects the path loss $PL_{i1}$ which has the smallest value among the path losses $\{PL_1, PL_2, \ldots, PL_N\}$ between UE and N points constituting the uplink JR CoMP cooperated set after receiving $P_{offset}$ from eNB. That is, $PL_{i1}$ which satisfies $PL_{i1}=\min\{PL_1, PL_2, \ldots, PL_N\}$ is selected.

Figure 10:
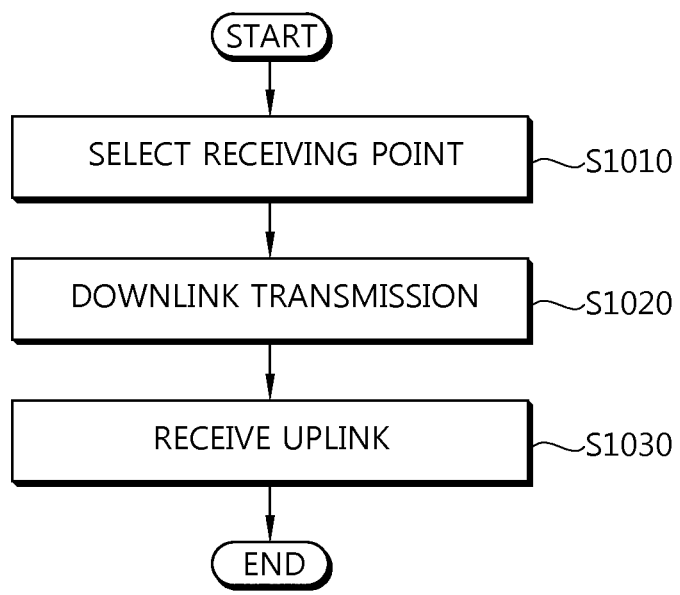
FIG. 10 is a flowchart schematically illustrating the operation of eNB in a system according to the present invention.

Subsequently, UE selects path losses whose differences from $PL_{i1}$ are smaller than $P_{offset}$. For example, UE selects path losses $PL_x$ which meet Math Figure 10:

Math Figure 10

$$|PL_X - PL_{i1}| \leq P_{offset} \qquad \text{[Math. 10]}$$

If the number of $PL_x$ satisfying Math Figure 10 is M, UE may calculate the effective path loss $PL_E$ using the selected M path losses $\{PL_{i1}, PL_{i2}, \ldots, PL_{iM}\}$. The method of calculating $PL_E$ has been described above in connection with Math Figures 8 and 9.

FIG. 8 is a flowchart schematically illustrating the operation of eNB in a system according to the present invention in case of STM.

Referring to FIG. 8, eNB first selects receiving points of uplink JR CoMP (S810). Subsequently, eNB determines additional information to be transmitted to UE for power control of the uplink JR CoMP (S820). The additional information may include, for example, path loss power offset $P_{offset}$ and the number M of path losses used for calculating the effective path loss. The additional information may be determined based on the receiving points selected in step S810.

eNB transmits a signal to UE through the downlink transmission (S830). eNB may transmit the additional information to UE through the upper layer signaling, such as RRC message, or dynamic signaling, such as DCI over PDCCH.

eNB receives the signal transmitted from UE (S840). The uplink transmission from UE is made with power based on the effective path loss calculated by UE using the additional information transmitted from eNB. The method of calculating the effective path loss using the additional information and the power control method of determining the transmission power based on the effective path loss have been described above.

FIG. 9 is a flowchart schematically illustrating the operation of UE in a system according to the present invention in case of STM.

Referring to FIG. 9, UE receives the additional information from eNB (S910). The additional information may include the path loss power offset $P_{offset}$ and the number M of path losses for selecting the path losses to be reflected to the effective path loss. The additional information is transmitted to UE through the upper layer signaling or dynamic signaling.

UE receives signals from the transmission points in the CoMP cooperated set (S920). UE may calculate the path losses between UE the corresponding points as in Math Figure 5 based on the reference signals received from the transmission points.

UE calculates the effective path loss based on the received additional information (S930). The method of calculating the effective path loss by UE based on the additional information has been described above.

UE performs uplink power control based on the effective path loss (S940). The method of calculating the uplink transmission power and performing power control by UE has been described above.

UE transmits a signal to the receiving points of JR CoMP with the uplink transmission power calculated through power control (S950).

In Case of TM (Transparent Mode)

In case of TM, information regarding the path loss for power control is not transmitted from eNB to UE. For example, eNB does not inform UE of the receiving points of uplink JR CoMP nor does eNB transmit the additional information to UE.

Accordingly, based on predetermined parameters set between UE and eNB, UE may calculate the effective path loss for uplink JR CoMP and based on this may perform power control to determine power control.

For example, the number M of the smallest path losses used for optimizing and calculating the effective path loss may be set as a predetermined value. In case that 3 is set as M, UE may calculate the effective path loss $PL_E$ based on three path losses having the smallest values among the path losses for the points in the CoMP cooperated set.

Further, the path loss power offset $P_{offset}$ used for optimizing and calculating the effective path loss may be set as a predetermined value. For example, if $P_{offset}$ is set as 5 dBm, UE may select the path loss having the smallest value among the path losses for the points in the CoMP cooperated set and path losses whose values are not larger by 5 dBm or more than the path loss having the smallest value to thereby calculate the effective path loss.

FIG. 10 is a flowchart schematically illustrating the operation of eNB in a system according to the present invention.

Referring to FIG. 10, eNB first selects receiving point in the uplink JR CoMP (S1010).

Subsequently, eNB performs downlink transmission alone or in combination with other transmission points in the CoMP system (S1020). In the TM mode, as described above, eNB does not inform UE of the receiving points of uplink JR CoMP nor does eNB transmit additional information to UE.

eNB receives uplink transmission from UE (S1030). Although eNB does not inform UE of the receiving points of uplink JR CoMP nor does it transmit additional information to UE, UE may calculate the effective path loss according to the preset parameters to perform power control and may thus perform uplink transmission.

Figure 11:
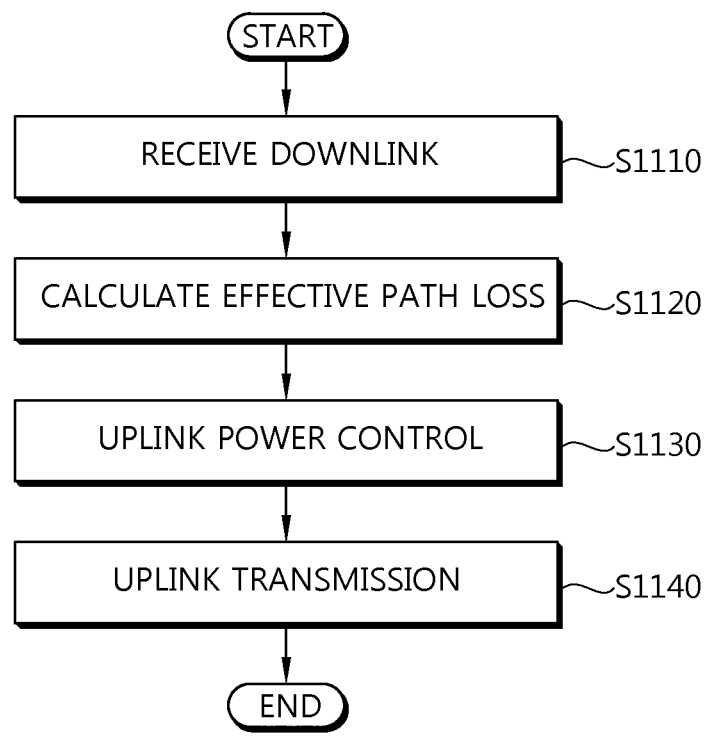
FIG. 11 is a flowchart schematically illustrating the operation of UE in a system according to the present invention in case of TM.

FIG. 11 is a flowchart schematically illustrating the operation of UE in a system according to the present invention in case of TM.

Referring to FIG. 11, UE receives downlink transmission from transmission points in the CoMP system (S1110). In case of TM, the uplink JR CoMP receiving points are not indicated by eNB nor is the additional information transmitted. UE may calculate the path loss in Math Figure 5 based on the reference signals received from the transmission points.

UE calculates the effective path loss according to the set parameter (S1120). If the number M of path losses used for calculating the effective path loss is preset, UE may calculate the effective path loss $PL_E$ using M as described above. Further, if the path loss power offset $P_{offset}$ used for calculating the effective path loss is preset, UE may calculate the effective path loss using $P_{offset}$ as described above.

UE performs uplink power control based on the calculated effective path loss (S1130). The method of performing power control by UE to determine the uplink transmission power has been described above.

UE performs uplink transmission with the transmission power determined through power control (S1140).

Figure 12:
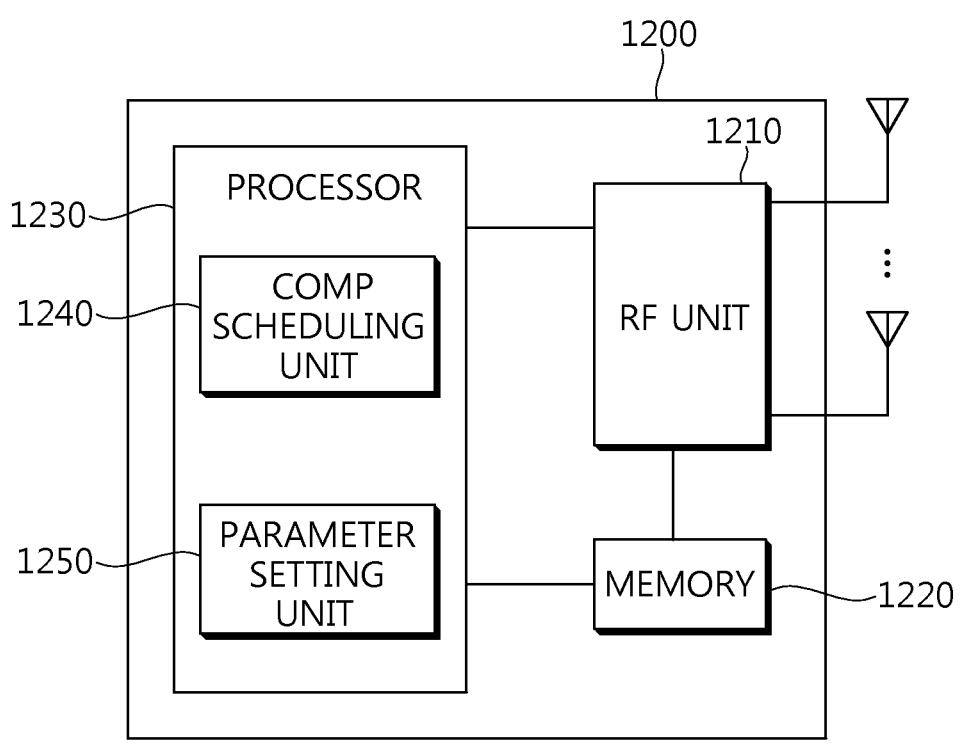
FIG. 12 is a block diagram schematically illustrating a configuration of eNB in a system according to the present invention.

FIG. 12 is a block diagram schematically illustrating a configuration of eNB in a system according to the present invention.

Referring to FIG. 12, eNB 1200 includes a RF unit 1210, a memory 1220, and a processor 1230. eNB 1200 performs wireless communication through the RF unit 1210, and the RF unit 1210 includes a plurality of antennas. The RF unit 1210 may support MIMO.

The memory 1220 may store information necessary for eNB 1200 to perform communication and to operate the system. For example, the memory 1220 may store information regarding preset parameter values necessary for operating the CoMP system, offset or number of path losses indicated by the PL indication bit.

The processor 1230 performs the operation for achieving the functions/purposes suggested herein. For example, the processor 1230 performs scheduling for each point in the CoMP system, generates a TPC command for UE, selects a receiving point of uplink JR CoMP, and generates information to be transmitted to UE so as to generate uplink transmission power.

The processor 1230 may include, for example, a CoMP scheduling unit 1240 and a parameter setting unit 1250. The CoMP scheduling unit 1240 may select a transmission point and a receiving point in the CoMP system and may perform scheduling on each point. Information regarding the receiving point selected by the CoMP scheduling unit 1240 may be transmitted to UE. The parameter setting unit 1250 may set parameters necessary for operating the network. For example, the parameter setting unit 1250 may set the number of path losses selected by UE to calculate an effective path loss $PL_E$. Further, the parameter setting unit 1250 may set a path loss power offset for calculating the effective path loss $PL_E$. The number of path losses and the path loss power offset may be set by referring to the number of the receiving points selected by the CoMP scheduling unit 1240. The information set by the parameter setting unit 1250 may be transmitted to UE through upper layer signaling or dynamic signaling.

Figure 13:
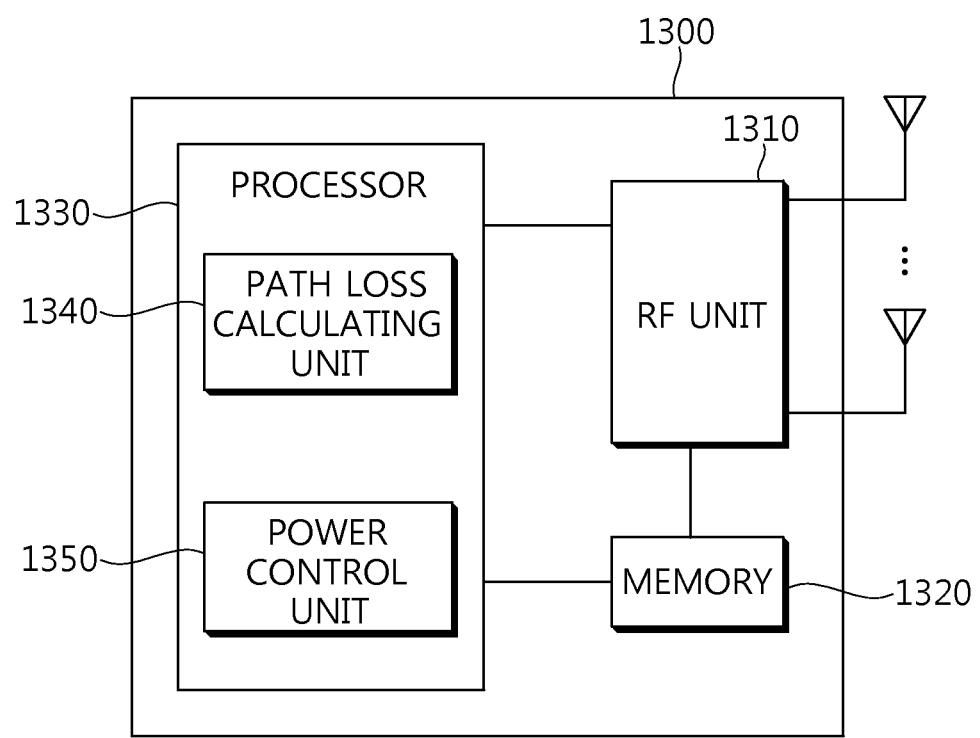
FIG. 13 is a block diagram schematically a configuration of UE in a system according to the present invention.

FIG. 13 is a block diagram schematically a configuration of UE in a system according to the present invention.

Referring to FIG. 13, the UE 1300 includes a RF unit 1310, a memory 1320, and a processor 1330. The UE 1300 performs wireless communication through the RF unit 1310. The RF unit 1310 includes a plurality of antennas and may support MIMO.

The memory 1320 may store information necessary for the UE 1300 to perform communication. For example, the memory 1320 may store the preset parameter values necessary for performing communication in the CoMP system, offset or number of path losses indicated by the PL indication bit, and system information received from eNB.

The processor 1330 performs the operation to achieve the functions/purposes suggested herein. For example, the processor 1330 may calculate path losses for points and based on this may determine an effective path loss. Further, the processor 1330 may perform power control based on the effective path loss and may determine uplink transmission power.

The processor 1330 may include, for example, a path loss calculating unit 1340 and a power control unit 1350. The path loss calculating unit 1340 may calculate the path loss in Math Figure 5 based on the reference signal received from each point in the CoMP system. For the selected receiving point in case of NTM, the effective path loss $PL_E$ may be calculated as described above based on the additional information in case of STM and based on the preset parameters in case of TM. Further, the power control unit 1350 may perform power control for uplink JR CoMP based on the parameters by upper layer signaling, TPC command, and effective path loss and may determine uplink transmission power.

The RF unit 1310 may perform uplink transmission with the transmission power determined by the power control unit 1350.

Although the embodiments of the present invention have been described, it will be understood by those skilled in the art that various modifications or variations may be made to the present invention without departing from the technical spirit or scope of the invention. Accordingly, the present invention is not limited to the embodiments and includes all the embodiments within the appended claims.

The invention claimed is:

1. A method of receiving an uplink signal, the method comprising:
    selecting receiving points in a Coordinated Multi-Point (CoMP) system;
    transmitting CoMP setting information to User Equipment (UE); and
    receiving uplink transmission from the UE, wherein uplink transmission power used for the uplink transmission is controlled based on an effective path loss calculated by using at least one of path losses between the UE performing the uplink transmission and points in the CoMP system,
    wherein the CoMP setting information includes information regarding a number M of the receiving points, and wherein the effective path loss is calculated based on M path losses having a smallest value among path losses for points in the CoMP system.

2. The method of claim 1, wherein the CoMP setting information includes information indicating the selected receiving points, and wherein the effective path loss is calculated based on path losses for the selected receiving points.

3. The method of claim 1, wherein the CoMP setting information includes information regarding a path loss offset, and wherein the effective path loss is calculated based on a path loss having the smallest value among path losses for points in the CoMP system and path losses whose differences from the path loss having the smallest value are smaller than the path loss offset.

4. The method of claim 1, wherein the CoMP setting information is included in downlink control information transmitted over Physical Downlink Control Channel (PDCCH).

5. The method of claim 1, wherein the CoMP setting information is included in a Radio Resource Control (RRC) message and transmitted.

6. A method of controlling uplink power, the method comprising:
    calculating path losses for transmission points in a Coordinated Multi-Point (CoMP) system;
    calculating an effective path loss based on at least one of the path losses; and
    performing uplink power control based on the effective path loss, wherein the effective path loss is calculated based on a predetermined number of reference path losses selected among the path losses,
    wherein the reference path losses include a predetermined standard reference path loss selected among the path losses and path losses whose differences from the standard reference path loss are smaller than an offset indicated by a base station.

7. The method of claim 6, wherein the reference path losses are path losses for receiving points indicated by the base station among the path losses.

8. The method of claim 6, wherein the reference path losses are path losses selected by a number indicated by the base station among the path losses.

9. The method of claim 8, wherein the reference path losses are path losses selected by a number indicated by the base station from among path losses having the smallest value of the path losses.

10. The method of claim 6, wherein the predetermined standard reference path loss is a path loss having the smallest value among the path losses.

11. The method of claim 6, wherein the reference path losses are selected by a number indicated by a predetermined parameter from among path losses having the smallest value of the path losses.

12. The method of claim 6, wherein the reference path losses include a path loss having the smallest value among the path losses and path losses whose differences from the path loss having the smallest value are smaller than an offset indicated by a predetermined parameter.

13. The method of claim 6, wherein information to select the reference path losses is transmitted from the base station through upper layer signaling or dynamic signaling.

14. An eNodeB (eNB) comprising:
- a Coordinated Multi-Point (CoMP) scheduler to select receiving points in a CoMP system; and
- a Radio Frequency (RF) transceiver to transmit CoMP setting information to User Equipment (UE) and to receive uplink transmission from the UE, wherein uplink transmission power used for the uplink transmission is controlled based on an effective path loss calculated by using at least one of path losses between the UE performing the uplink transmission and points in the CoMP system,
- wherein the CoMP setting information includes information regarding a number M of the receiving points, and wherein the effective path loss is calculated based on M path losses having a smallest value among path losses for points in the CoMP system.

15. The eNB of claim 14, wherein the CoMP setting information includes information indicating the selected receiving points, and wherein the effective path loss is calculated based on path losses for the selected receiving points.

16. A User Equipment (UE) comprising:
- a path loss calculator to calculate path losses for transmission points in a Coordinated Multi-Point (CoMP) system and to calculate an effective path loss based on at least one of the path losses; and
- a power controller to perform uplink power control based on the effective path loss, wherein the effective path loss is calculated based on a predetermined number of reference path losses selected among the path losses,
- wherein the reference path losses include a predetermined standard reference path loss selected among the path losses and path losses whose differences from the standard reference path loss are smaller than an offset indicated by an eNodeB (eNB).

17. The UE of claim 16, wherein the reference path losses are path losses for receiving points indicated by the eNB among the path losses.

\* \* \* \* \*